Dec. 3, 1957  N. A. WENDEL  2,814,981
TACOS MOLD
Filed Jan. 4, 1956
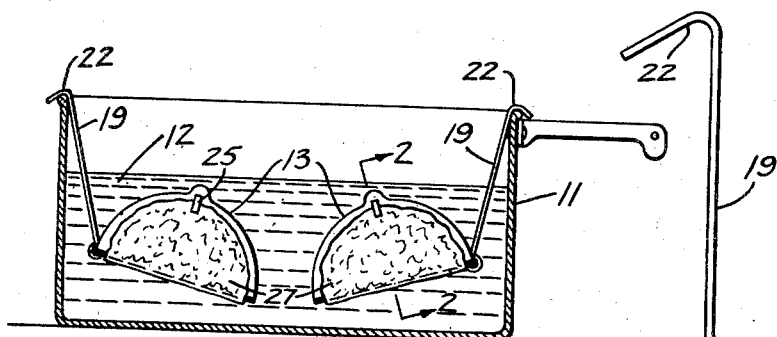
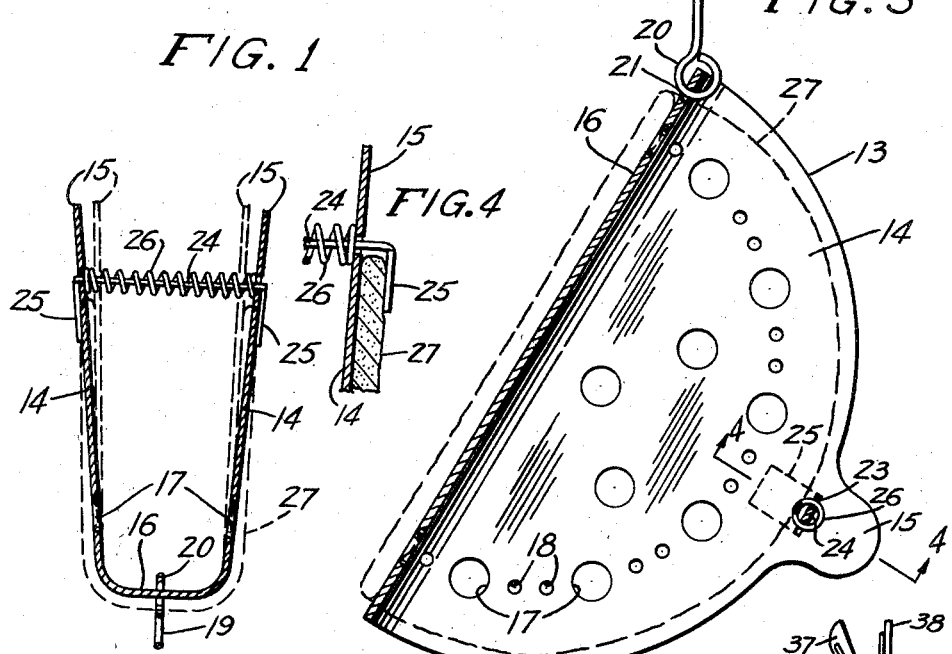
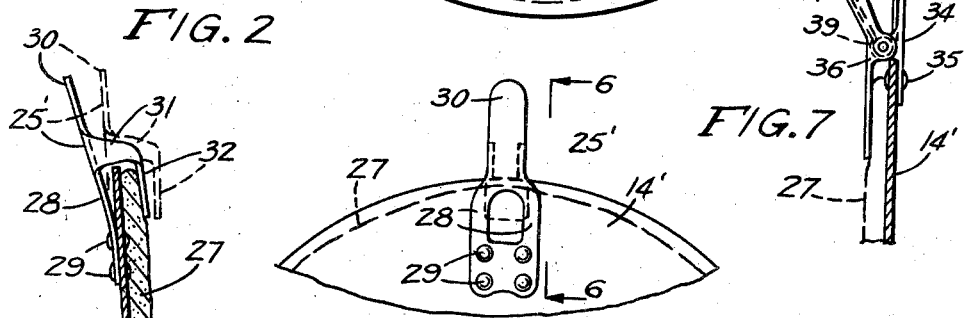
INVENTOR.
NOLAN A. WENDEL
BY
McMorrow, Berman & Davidson
ATTORNEYS

United States Patent Office 2,814,981
Patented Dec. 3, 1957

2,814,981

TACOS MOLD

Nolan A. Wendel, Cuero, Tex.

Application January 4, 1956, Serial No. 557,299

3 Claims. (Cl. 99—426)

This invention relates to devices for preparing food articles, and more particularly to a mold device for use in deep-frying a tortilla to form a "tacos" therefrom.

A main object of the invention is to provide a novel and improved mold device for forming a "tacos" from a raw tortilla by frying the tortilla in hot grease, the mold device being simple in construction, being provided with means for securely retaining the raw tortilla thereon in the proper shape to form the "tacos," providing uniform sizes and shapes of the resultant product, and minimizing breakage of the "tacos" shell.

A further object of the invention is to provide an improved mold device for use in deep-frying a raw tortilla in the form of a U-shaped shell adapted to contain ground meat, raw vegetables, and the like, the improved mold device being inexpensive to manufacture, being durable in construction, being easy to manipulate, being easy to keep clean, and greatly reducing the amount of time and effort required to form "tacos" shells from tortillas.

Further objects and advantages of the invention will become apparent from the following description and claims, and from the accompanying drawings, wherein:

Figure 1 is a vertical cross sectional view taken through a deep-frying kettle showing the manner in which mold devices according to the present invention are employed to support tortillas in the hot grease in the kettle to form the "tacos" shells.

Figure 2 is an enlarged cross sectional view taken on the line 2—2 of Figure 1, and showing the cross sectional structure of one of the mold devices.

Figure 3 is an enlarged vertical cross sectional view taken longitudinally through one of the mold devices of the present invention, as employed in Figure 1.

Figure 4 is an enlarged vertical cross sectional detail view taken on the line 4—4 of Figure 3 and showing the manner in which the marginal portion of a tortilla is clamped to the outer surface of the mold device in the form of the invention illustrated in Figures 1 to 3.

Figure 5 is a fragmentary front elevational view of the upper portion of a modified form of mold device according to the present invention, showing a different clamping means for securing the marginal portion of the tortilla to the exterior surface of the mold.

Figure 6 is a vertical cross sectional detail view taken on the line 6—6 of Figure 5.

Figure 7 is a vertical cross sectional detail view, similar to Figure 6, but showing a still further modified form of clamping means for securing the marginal portions of the tortilla to the exterior surface of the mold, in accordance with the present invention.

A tortilla is a well known food article largely used in Mexico and being used in the same manner as bread is used in the United States. A tortilla is generally circular in form and is frequently used in making another Mexican food article, known as a "tacos." A "tacos" consists of a tortilla formed to a U-shape and deep-fried in hot grease to from a shell in which specially prepared ground meat, raw lettuce, and the like, may be placed, and may be eaten by holding the "tacos," namely the rigid shell, in the hand.

It is a relatively difficult process to form and retain the U-shape of the tortilla while it is being deep-fried in hot grease. The device of the present invention is intended to facilitate this process by providing a mold or form on which the tortilla is secured during the deep-frying process.

Referring to the drawings, and more particularly to Figures 1 to 4, 11 designates a deep-frying kettle containing hot grease 12. Designated at 13 are respective mold devices on which tortillas are secured and immersed in the hot grease for deep-frying the tortillas.

Each mold 13 comprises a generally U-shaped sheet metal body, formed of suitable corrosion-resistant sheet metal, such as aluminum or the like, and being bent into a generally U-shape corresponding to the inside shape of the "tacos" to be prepared.

The sheet metal from which the mold 13 is fabricated is sufficiently thin so that the respective side arms 14, 14 of the form are relatively yieldable, and may be flexed towards each other, as shown in dotted view in Figure 2. The respective side arms 14, 14 are generally semi-circular in shape and are formed at the intermediate portions of their edges with respective generally semicircular lugs 15, as shown in Figures 2 and 3.

The side arms 14 and the bight portion of the mold, shown at 16 are formed with a plurality of apertures distributed thereover, for example, with a plurality of large apertures 17 which are relatively widely separated and with additional small apertures 18 arranged between successive large apertures 17, as illustrated in Figure 3.

Designated at 19 is a wire hook member which is pivotally connected to one end of the bight portion 16 of the mold, as by an eye element 20 on the hook member which engages through an aperture 21 provided in the end of bight portion 16. The hook member 19 is employed to support the mold in the kettle 11, as by having its bight portion, shown at 22, engaged over the edge of the kettle in the manner illustrated in Figure 1.

The hook 19 serves not only to support the mold in the kettle, but also as a means for lifting the mold out of the kettle and for placing the mold in the kettle, and avoiding the necessity of grasping the main body of the mold when it is necessary to transport said mold.

The respective side arms 14, 14 are formed at the base of the respective lugs 15 with respective slots 23 through which slidably extend respective opposite end portions of a relatively narrow flat bar member 24, the end portions of the bar member being bent downwardly and widened to define relatively wide depending clamping arms 25, 25 extending adjacent the exterior surface of the respective side arms 14, 14, as shown in Figure 2. Engaged on the bar 24 between the side arms 14, 14 is a coiled spring 26 whose opposite ends bear on the respective lugs 15, 15 and bias the side arms toward the respective clamping elements 25, 25.

In using the device, a tortilla, shown in dotted view at 27 is engaged around the exterior surface of the mold body 13, and the opposite marginal portions of the tortilla are engaged between the respective clamping arms 25, 25 and the respective upper portions of the outside surfaces of the side arms 14, 14, as shown in dotted view in Figure 2, the side arms being flexed inwardly to allow the opposite marginal portions of the tortilla to be inserted between the arms 25 and the side arms 14, 14. After the opposite marginal portions of the tortilla are in this position, the retaining force on the lugs 15, 15 is released, allowing the arms to flex outwardly toward their normal positions, whereby the opposite marginal portions of the tortilla are clamped between the respective side arms 14 and the respective clamping arms 25 in the manner illustrated in Figure 4. The mold device carrying the tortilla 27 is then placed in the kettle 11 and is supported therein by engaging the bight portion 22 of the hook member 19 on the edge of the kettle, as previously described. After the tortilla has been hardened by deep-frying in the hot grease 12, the mold device is lifted out of the kettle, employing the hook member 19 as a handle, and the "tacos," resulting from the deep-frying of the tortilla, is released from the mold device by flexing the side arms 14, 14 inwardly, employing the finger lugs 15, 15 to exert the inward flexing force on said side arms.

After the "tacos" has been removed from the mold device, the device may be employed to form another "tacos" by placing a tortilla thereon, and proceeding in the manner above described.

In the modified form of the mold device, shown in Figures 5 and 6, the cross bar 24 of the previously described form of the invention is omitted, and instead, respective individual spring clips 25' are provided on the top ends of the respective side arms of the mold device, shown at 14'. Thus, each spring clip 25' comprises a resilient main body 28 which is secured to the inside surface of the associated arm 14', as by a plurality of rivets 29, the body 28 extending upwardly beyond the top edge of the arm 14' and being formed at its top end with a finger tab 30. The finger tab 30 is relatively rigid, whereas the lower portion of the body 28 is relatively resilient. Between the rigid finger tab portion 30 and the resilient lower portion of the body 28, said body is formed with a rigid arm 31 extending over the edge of the arm 14' and provided with a depending clamping lug 32 of substantial length. As shown in Figure 6, the marginal portion of a tortilla 27 is engageable between the clamping lug 32 and the side arm 14' and is clampingly secured to the side arm 14' by the spring action of the resilient lower portion of the clip body 28. The clip may be flexed to its dotted view position, shown in Figure 6, to provide a sufficient space between the clamping arm 32 and side arm 14' to allow the marginal portion of the tortilla 27 to be inserted, prior to the deep-frying of the tortilla, and may be similarly flexed to its dotted view position when it is desired to release the resulting "tacos" and to allow the "tacos" to be disengaged from the form.

Referring now to Figure 7, a further modification of the tortilla clamping means is illustrated, consisting of a pivoted jaw clip having the main body 34 which is rigidly secured, as by a rivet 35 to the side arm 14' at the inside surface of the side arm, the body 34 projecting upwardly a substantial distance beyond the top edge of the side arm, as shown, and having pivotally connected thereto the clamping jaw 36 which depends a substantial distance below the top edge of the side arm 14'. The clamping jaw 36 is provided with the finger grip portion 37 which projects upwardly opposite to the upwardly projecting top portion 38 of the main body 34. The clip is provided with a suitable coiled spring 39 which has one end thereof bearing against the upstanding member 38 and the other end thereof bearing against the inside wall of the upstanding member 37, biasing the members 37 and 38 apart, and therefore biasing the depending clamping arm 36 towards the exterior surface of the mold side arm 14'. As will be readily apparent, the marginal portion of a tortilla 27 may be engaged between the depending arm 36 and the side arm 14' and may be clampingly secured thereto by the action of the spring 39 of the clip assembly.

While certain specific embodiments of an improved mold device for forming a "tacos" from a tortilla have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A mold device for use in deep-frying a tortilla comprising a generally U-shaped sheet metal form having a bight portion and relatively yieldable, generally semicircular side arms, said form being adapted to receive a tortilla to be fried on its exterior surface, a transverse clip member extending through the upper portions of said side arms and having depending ends, and spring means on said clip member and acting between said side arms, said spring means being formed and arranged to exert clamping force between the side arms and the ends of said clip member to secure the opposite marginal portions of the tortilla against the exterior surfaces of the side arms.

2. A mold device for use in deep-frying a tortilla comprising a generally U-shaped sheet metal form having a bight portion and relatively yieldable, generally semicircular side arms, said form being adapted to receive a tortilla to be fried on the exterior surface of the form, a transverse clip member extending through the upper portions of said side arms and having end portions disposed adjacent the exterior surfaces of said upper portions, respective depending clamping arms on said end portions, and spring means mounted on said clip member and being formed and arranged to exert clamping force between said side arms and said clamping arms to secure the opposite marginal portions of a tortilla against said side arms.

3. A mold device for use in deep-frying a tortilla comprising a generally U-shaped sheet metal form having a bight portion and relatively yieldable, generally semicircular side arms, said form being adapted to receive a tortilla to be fried on the exterior surface of the form, a transverse clip member extending through the upper portions of said side arms, respective depending clamping arms on the ends of said clip member extending adjacent the exterior surfaces of the side arms, and spring means acting on said clamping arms and being formed and arranged to exert clamping force between said side arms and said clamping arms to secure the opposite marginal portions of a tortilla against said side arms.

References Cited in the file of this patent

UNITED STATES PATENTS

| | | |
|---|---|---|
| 2,454,857 | Bish | Nov. 30, 1948 |
| 2,664,812 | Molina | Jan. 5, 1954 |
| 2,740,349 | De Gonia | Apr. 3, 1956 |
| 2,775,929 | Johnson et al. | Jan. 1, 1957 |